US011374977B2

(12) United States Patent
Rahkonen et al.

(10) Patent No.: US 11,374,977 B2
(45) Date of Patent: Jun. 28, 2022

(54) ENDPOINT RISK-BASED NETWORK PROTECTION

(71) Applicant: Forcepoint LLC, Austin, TX (US)

(72) Inventors: Valtteri Rahkonen, Helsinki (FI); Jaakko Moller, Helsinki (FI)

(73) Assignee: Forcepoint LLC, Austin, TX (US)

( * ) Notice: Subject to any disclaimer, the term of this patent is extended or adjusted under 35 U.S.C. 154(b) by 437 days.

(21) Appl. No.: 16/136,659

(22) Filed: Sep. 20, 2018

(65) Prior Publication Data
US 2020/0099719 A1    Mar. 26, 2020

(51) Int. Cl.
H04L 9/40        (2022.01)
H04L 67/5682     (2022.01)

(52) U.S. Cl.
CPC .......... H04L 63/20 (2013.01); H04L 63/1416 (2013.01); H04L 63/1425 (2013.01); H04L 63/1441 (2013.01); H04L 67/2852 (2013.01)

(58) Field of Classification Search
CPC . H04L 63/20; H04L 63/1441; H04L 67/2852; H04L 63/1416; H04L 63/1425; H04L 67/2842; H04L 67/42
See application file for complete search history.

(56) References Cited

U.S. PATENT DOCUMENTS

| 7,849,502  | B1 * | 12/2010 | Bloch ............... H04L 63/168 726/11 |
| 8,516,586  | B1 * | 8/2013  | Jensen .............. H04L 63/1425 726/23 |
| 8,527,631  | B1 * | 9/2013  | Liang ............... H04L 63/1441 709/225 |
| 9,430,646  | B1 * | 8/2016  | Mushtaq ........... H04L 63/1425 |
| 2006/0253458 | A1 * | 11/2006 | Dixon .................... G06Q 30/02 |
| 2007/0073660 | A1 * | 3/2007  | Quinlan ............... H04L 63/126 |
| 2007/0208817 | A1 * | 9/2007  | Lund .................. H04L 67/327 709/206 |
| 2010/0005291 | A1 * | 1/2010  | Hulten ................... G06F 21/51 713/156 |
| 2010/0058468 | A1 * | 3/2010  | Green .................. G06F 21/51 726/22 |
| 2011/0185423 | A1 * | 7/2011  | Sallam ................ H04L 63/145 726/23 |
| 2011/0296519 | A1 * | 12/2011 | Ide ..................... G06F 21/30 726/13 |
| 2012/0023583 | A1 * | 1/2012  | Sallam ................ G06F 21/564 726/24 |
| 2012/0192275 | A1 * | 7/2012  | Oliver ................. G06F 21/51 726/24 |
| 2013/0042294 | A1 * | 2/2013  | Colvin ................ H04L 63/145 726/1 |
| 2013/0254880 | A1 * | 9/2013  | Alperovitch ........ H04L 63/1408 726/22 |

(Continued)

Primary Examiner — Robert B Leung
(74) Attorney, Agent, or Firm — Jackson Walker L.L.P.

(57) ABSTRACT

A method, system, and computer-usable medium are disclosed for managing network communication by, responsive to an attempted connection from a client to a server, receiving information regarding the connection from the client, determining if the information regarding the connection matches an entry of a reputation cache, and responsive to determining that the information regarding the connection matches an entry of the reputation cache, undertaking a remedial action in accordance with a security policy.

18 Claims, 3 Drawing Sheets

(56) References Cited

U.S. PATENT DOCUMENTS

| | | | |
|---|---|---|---|
| 2014/0173723 A1* | 6/2014 | Singla | G06F 21/552 |
| | | | 726/22 |
| 2014/0273950 A1* | 9/2014 | Li | H04W 24/08 |
| | | | 455/410 |
| 2014/0331119 A1* | 11/2014 | Dixon | G06Q 30/02 |
| | | | 715/234 |
| 2015/0096018 A1* | 4/2015 | Mircescu | G06F 21/56 |
| | | | 726/23 |
| 2015/0172146 A1* | 6/2015 | Mahaffey | H04L 43/04 |
| | | | 709/224 |
| 2016/0321452 A1* | 11/2016 | Richardson | G06F 21/50 |
| 2017/0310692 A1* | 10/2017 | Ackerman | H04L 63/1425 |
| 2017/0310693 A1* | 10/2017 | Howard | H04L 63/1425 |
| 2017/0359306 A1* | 12/2017 | Thomas | H04L 63/10 |
| 2018/0191717 A1* | 7/2018 | Rajagopal | H04W 12/08 |
| 2018/0359244 A1* | 12/2018 | Cockerill | H04L 63/0876 |

\* cited by examiner

ENDPOINT RISK-BASED NETWORK PROTECTION

FIELD OF DISCLOSURE

The present invention relates in general to the field of computers and similar technologies, and in particular to software utilized in this field. Still more particularly, it relates to a method, system, and computer-usable medium for performing endpoint risk-based protection with respect to network traffic.

BACKGROUND

While network communication among networked computers, including the use of the Internet, has many advantages, one downside to network communication is that it may render networked computers susceptible to malicious attacks from viruses or other intrusions.

With existing approaches to inspection of network communication, it is possible to monitor an executable binary which initiated a connection through a firewall. For example, inspection systems can, using existing approaches, determine which binary initiated a connection to a known botnet or may be listening on ports on a client system connected by a botnet. An inspection system may also identify and monitor that certain binaries may be attacking hosts in the network. It may also be currently possible using current approaches to automatically blacklist the source or destination traffic based on Internet Protocol addresses and ports, but the blacklist does not prevent the a program from opening bad connections unless the inspection system blocks all traffic from the specific host, which may also affect legitimate traffic.

In order to gain more fine-grained capability to prevent bad executables from infiltrating a network, network administrators may need manually tag malicious executables and then block them by using an appropriate policy. In practice, if malware starts to spread in a network, manual intervention may be too late and it is possible an entire network has been compromised prior the reputation being set by the administrator of the system.

Accordingly, a more robust approach to network protection is desired.

SUMMARY

In accordance with the teachings of the present disclosure, certain disadvantages and problems associated with existing approaches to network and data security have been reduced or eliminated.

In accordance with embodiments of the present disclosure, a computer-implementable method for managing network communication may include, responsive to an attempted connection from a client to a server, receiving information regarding the connection from the client, determining if the information regarding the connection matches an entry of a reputation cache, and responsive to determining that the information regarding the connection matches an entry of the reputation cache, undertaking a remedial action in accordance with a security policy.

In accordance with these and other embodiments of the present disclosure, a system may include a processor, a data bus coupled to the processor, and a non-transitory, computer-readable storage medium embodying computer program code, the non-transitory, computer-readable storage medium being coupled to the data bus, the computer program code interacting with a plurality of computer operations and comprising instructions executable by the processor. The instructions may be configured for, responsive to an attempted connection from a client to a server, receiving information regarding the connection from the client, determining if the information regarding the connection matches an entry of a reputation cache, and responsive to determining that the information regarding the connection matches an entry of the reputation cache, undertaking a remedial action in accordance with a security policy.

In accordance with these and other embodiments of the present disclosure, a non-transitory, computer-readable storage medium may embody computer program code, the computer program code comprising computer executable instructions configured for, responsive to an attempted connection from a client to a server, receiving information regarding the connection from the client, determining if the information regarding the connection matches an entry of a reputation cache, and responsive to determining that the information regarding the connection matches an entry of the reputation cache, undertaking a remedial action in accordance with a security policy.

Technical advantages of the present disclosure may be readily apparent to one having ordinary skill in the art from the figures, description and claims included herein. The objects and advantages of the embodiments will be realized and achieved at least by the elements, features, and combinations particularly pointed out in the claims.

It is to be understood that both the foregoing general description and the following detailed description are explanatory examples and are not restrictive of the claims set forth in this disclosure.

BRIEF DESCRIPTION OF THE DRAWINGS

A more complete understanding of the example, present embodiments and certain advantages thereof may be acquired by referring to the following description taken in conjunction with the accompanying drawings, in which like reference numbers indicate like features, and wherein.

DETAILED DESCRIPTION

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a mobile device such as a tablet or smartphone, a consumer electronic device, a connected "smart device," a network appliance, a network storage device, a network gateway device, a server or collection of servers or any other suitable device and may vary in size, shape, performance, functionality, and price. The information handling system may include volatile and/or non-volatile memory, and one or more processing resources such as a central processing unit (CPU) or hardware or software control logic. Additional components of the information handling system may include one or more storage systems, one or more wired or wireless interfaces for communicating with other networked devices, external devices, and various input and output (I/O) devices, such as a keyboard, a mouse, a microphone, speakers, a track pad, a touchscreen and a display device (including a touch sensitive display device). The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or solid state drive), a sequential access storage device (e.g., a tape disk drive), optical storage device, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

Figure 1:
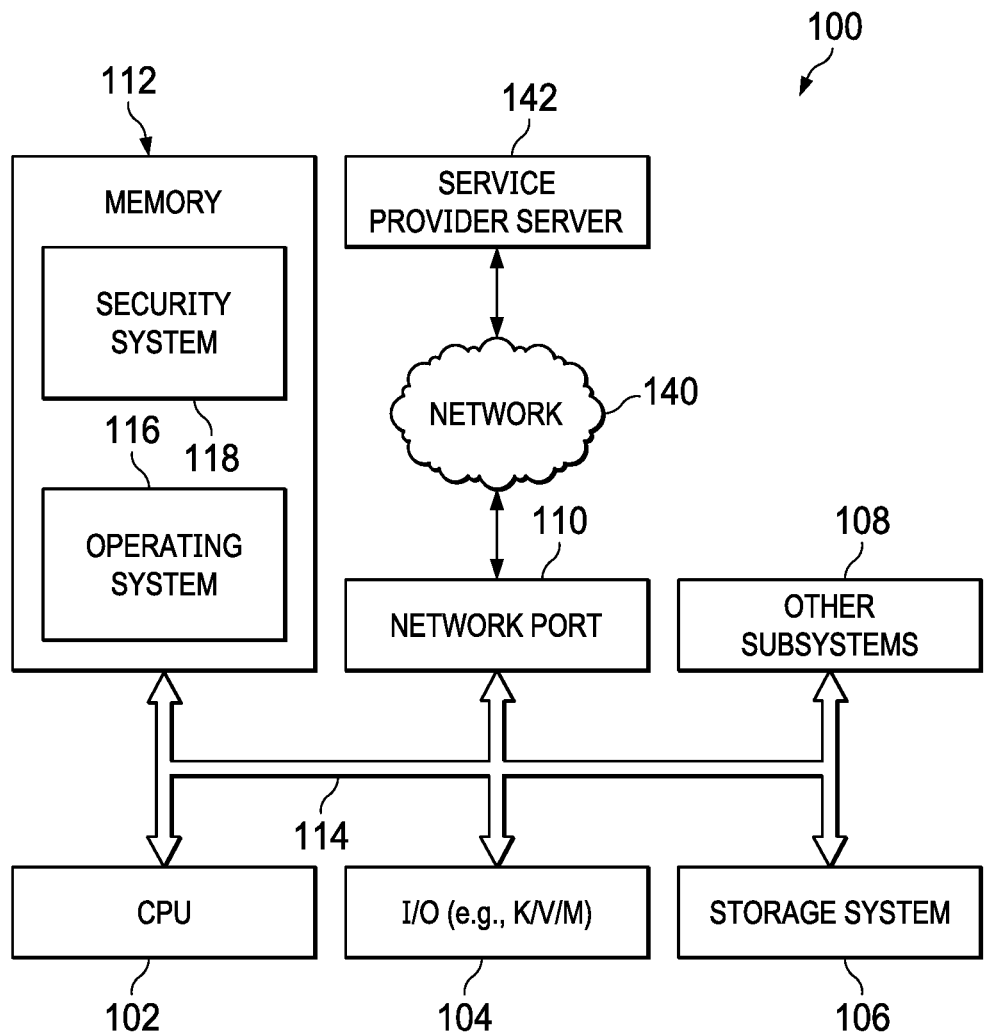
FIG. 1 illustrates an example information handling system in which the methods and systems disclosed herein may be implemented, in accordance with embodiments of the present disclosure.

FIG. 1 illustrates an example information handling system 100 in which the methods and systems disclosed herein may be implemented, in accordance with embodiments of the present disclosure. Information handling system 100 may include a processor (e.g., central processor unit or "CPU") 102, input/output (I/O) devices 104 (e.g., a display, a keyboard, a mouse, and/or associated controllers), a storage system 106, and various other subsystems 108. In various embodiments, information handling system 100 may also include network port 110 operable to couple to a network 140, which may likewise be accessible by a service provider server 142. Information handling system 100 may also include system memory 112, which may be coupled to the foregoing via one or more buses 114. System memory 112 may store operating system (OS) 116 and in various embodiments may also include a security system 118. In some embodiments, information handling system 100 may be able to download security system 118 from service provider server 142. In other embodiments, security system 118 may be provided as a service from the service provider server 142.

In various embodiments, security system 118 may be configured to perform endpoint risk-based network protection, as described in greater detail below. In some embodiments, security system 118 and the functionality thereof may improve processor efficiency, and thus the efficiency of information handling system 100, by performing network security operations with greater efficiency and with decreased processing resources as compared to existing approaches for similar network security operations. In these and other embodiments, security system 118 and the functionality thereof may improve effectiveness in ensuring network security, and thus the effectiveness of information handling system 100, by performing network security operations with greater effectiveness as compared to existing approaches for similar network security operations. As will be appreciated, once information handling system 100 is configured to perform the functionality of security system 118, information handling system 100 becomes a specialized computing device specifically configured to perform the functionality of security system 118, and is not a general purpose computing device. Moreover, the implementation of functionality of security system 118 on information handling system 100 improves the functionality of information handling system 100 and provides a useful and concrete result of improving network security and performing network security operations with greater efficiency and with decreased processing resources by enabling performance of endpoint risk-based network protection as described herein.

Figure 2:
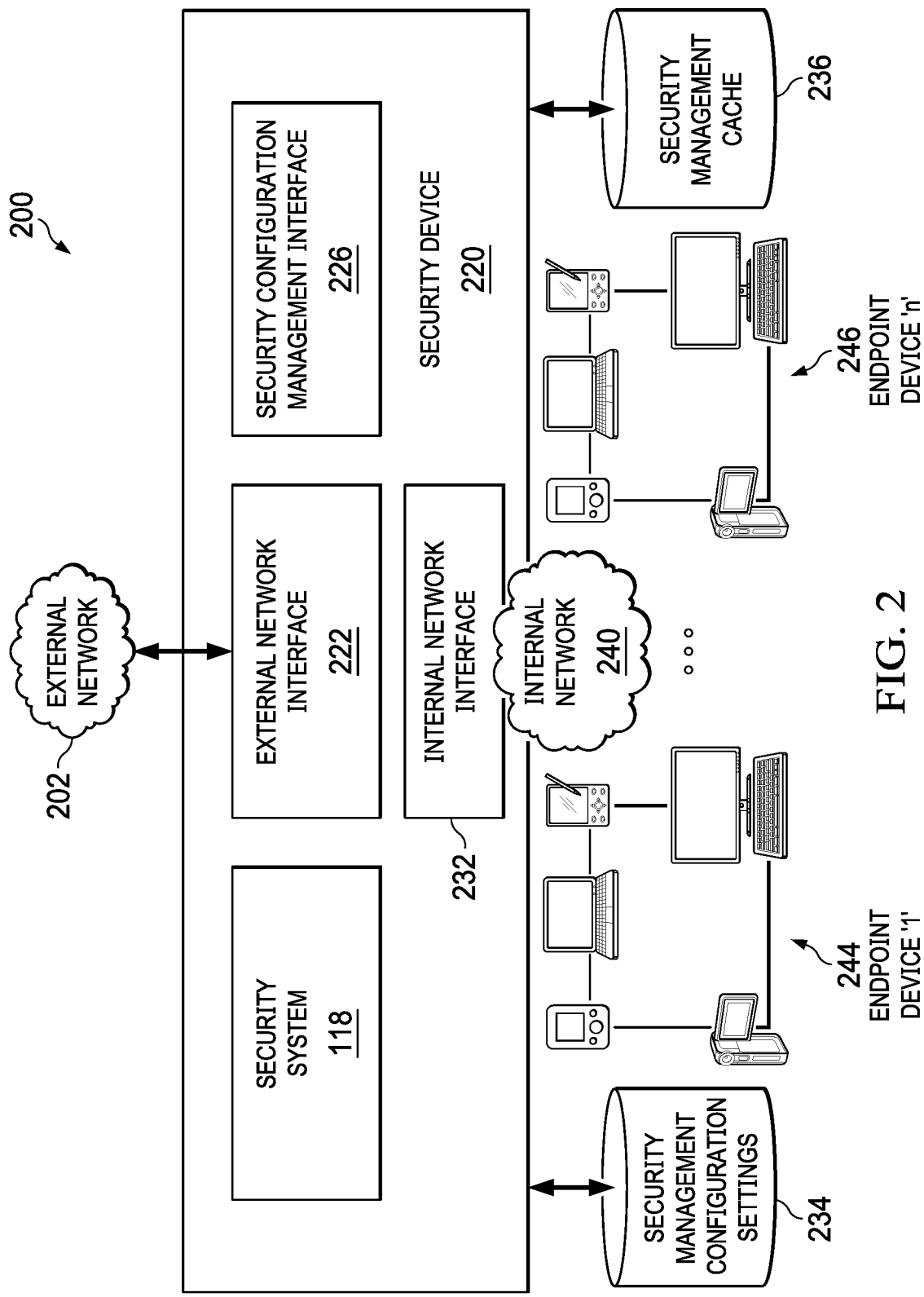
FIG. 2 illustrates a block diagram of a system for performing endpoint risk-based network protection, in accordance with embodiments of the present disclosure.

FIG. 2 illustrates a block diagram of a system 200 for performing endpoint risk-based network protection, in accordance with embodiments of the present disclosure. In some embodiments, a security device 220 may include an external network interface 222, a security configuration management interface 226, an internal network interface 232, and a security system 118. Security device 220 may be implemented using any suitable information handling system 100, including without limitation a gateway, a firewall, an intrusion prevention system, an intrusion detection system, or any other suitable security device capable of implementing security system 118. In some embodiments, security device 220 may be implemented as an individual security device 220, a virtual context security device 220, or a security device 220 cluster.

Security device 220 may also include in some embodiments a repository of security management configuration settings 234 and a security management cache 236. In certain embodiments, security configuration management interface 226 may be implemented to receive instructions relating to network security policy decisions from security system 118.

Skilled practitioners of the art will be familiar with network communication involving communicating Internet Protocol (IP) datagrams, or packets, to a target group of recipient network addresses in real-time or near real-time. In some embodiments, the target group recipient network addresses may be respectively associated with a corresponding endpoint device '1' 244 through 'n' 246. As used herein, an endpoint device refers to an information processing system such as a personal computer, a laptop computer, a tablet computer, a smart phone, a mobile telephone, a digital camera, a video camera, or other device capable of storing, processing and communicating data via a network, such as an internal network 240 interfaced to internal network interface 232. In various embodiments, the communication of the data may take place in real-time or near-real-time.

Embodiments of the invention may reflect an appreciation that network communication may represent an efficient means for communicating useful information. However, those of skill in the art will likewise appreciate that it may be desirable to secure such network communication to prevent malicious attacks on network components. Many existing solutions for providing security in a network environment have disadvantages, as described in the Background section of this application. However, security system 118 as disclosed herein may overcome these disadvantages by enabling performance of endpoint risk-based network protection, as described herein.

Figure 3:
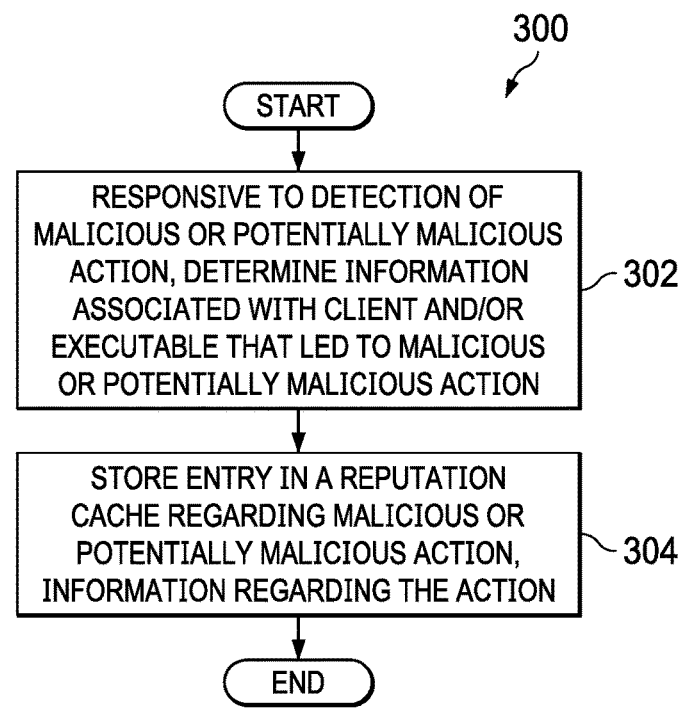
FIG. 3 illustrates a flow chart of an example method for building a reputation cache for use in performing endpoint risk-based network protection, in accordance with embodiments of the present disclosure.

FIG. 3 illustrates a flow chart of an example method 300 for building a reputation cache for use in performing endpoint risk-based network protection, in accordance with embodiments of the present disclosure. According to some embodiments, method 300 may begin at step 302. As noted above, teachings of the present disclosure may be implemented in a variety of configurations of information handling system 100. As such, the preferred initialization point for method 300 and the order of the steps comprising method 300 may depend on the implementation chosen. At step 302, responsive to detection by a security system (e.g., security system 118) of a malicious or potentially malicious action with respect to network traffic monitored or inspected by the security system, the security system may determine a client device (e.g., endpoint device 244, 246), client executable (e.g., an application executing on an endpoint device 244, 246), server program (e.g., an application executing in an external network and communicating with an endpoint device 244, 246), and/or signer(s) of the executable and/or program, that led to the occurrence of the malicious or potentially malicious action.

At step 304, the security system may store an entry in a reputation cache regarding the malicious or potentially malicious action, with the entry including information regarding the action, including without limitation the type of malicious action, a client device associated with occurrence of the action, a client executable associated with occurrence of the action, a server program, signer(s) of the executable and/or program associated with occurrence of the action, a program executed via an interpreter or virtual machine, an executable program's parent processors, and/or dynamic linked libraries associated with an executable program. As used herein, a reputation cache may include any information that may be used by a security system to evaluate a risk associated with a malicious or potentially malicious action, including results of content inspections, fingerprinting, malware scanning, or any other method for inspecting unobfuscated executed content. Such reputation cache may be stored as a part of security management cache 236. After step 304 completes, method 300 may end, provided that method 300 may be repeated for each malicious or potentially malicious action that is detected by the security system.

Although FIG. 3 discloses a particular number of steps to be taken with respect to method 300, method 300 may be executed with greater or fewer steps than those depicted in FIG. 3. In addition, although FIG. 3 discloses a certain order of steps to be taken with respect to method 300, the steps comprising method 300 may be completed in any suitable order.

Method 300 may be implemented using CPU 102, security system 118 executing thereon, and/or any other system operable to implement method 300. In certain embodiments, method 300 may be implemented partially or fully in software and/or firmware embodied in computer-readable media.

Accordingly, the security system may build a reputation cache with multiple entries, each entry setting forth relevant information regarding malicious or potentially malicious actions, and the client devices, client executables, server programs, and/or signer(s) of the executables and/or programs associated with occurrence of the actions. As described in further detail below, information set forth in the reputation cache may be used in a security policy enforced by the security system to prevent network connections by a client to malicious or potentially malicious destinations. As a specific example, because executables are typically signed, if some malicious program is detected by the security system, a signer of the malicious program could be categorized as suspicious, thus preventing further connections to and from all programs signed by the signer, and providing protection against future releases of the malicious programs by that signer. As another example, reputation cache information may be used to provide adaptive risk protection, to adapt a risk level of a user if a user is using malicious tools or a compromised client.

Figure 4:
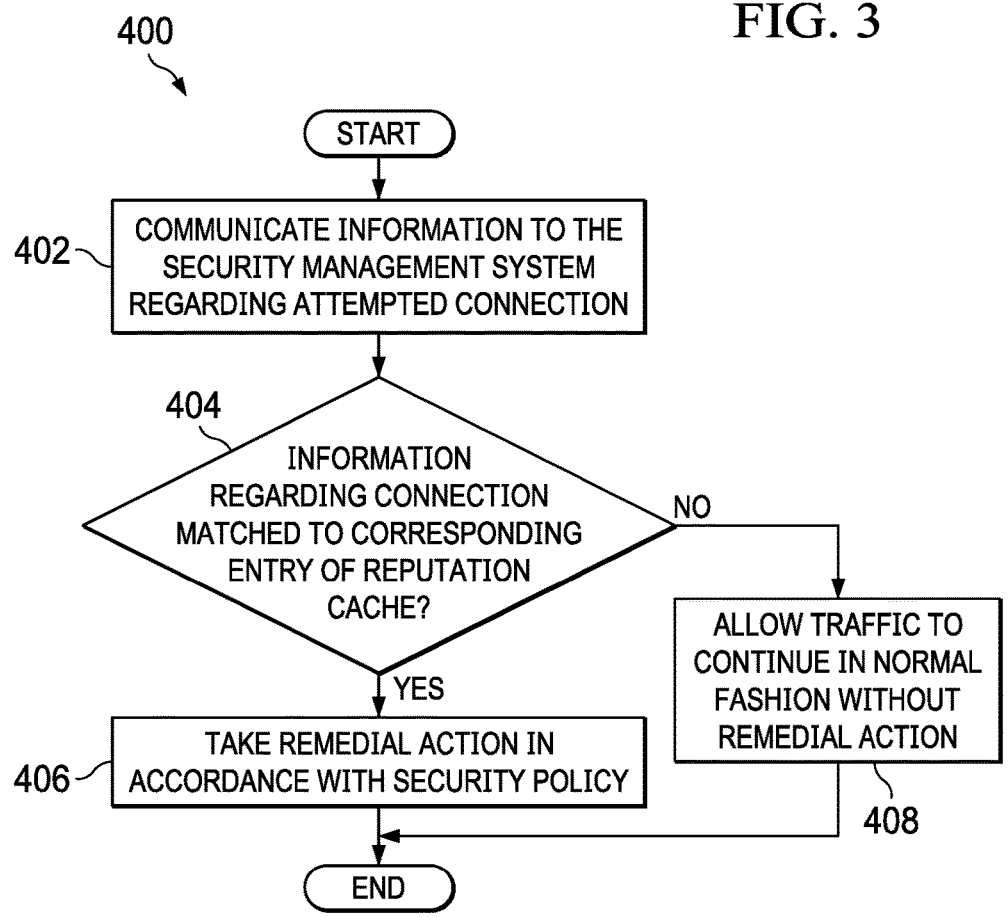
FIG. 4 illustrates a flow chart of an example method for performing endpoint risk-based network protection, in accordance with embodiments of the present disclosure.

FIG. 4 illustrates a flow chart of an example method 400 for performing endpoint risk-based network protection, in accordance with embodiments of the present disclosure. According to some embodiments, method 400 may begin at step 402. As noted above, teachings of the present disclosure may be implemented in a variety of configurations of information handling system 100. As such, the preferred initialization point for method 400 and the order of the steps comprising method 400 may depend on the implementation chosen.

At step 402, in association with attempting to establish a connection with a server, a client may communicate information to the security system regarding the connection, including information regarding the client, information regarding the executable used by the client to establish the connection (e.g., type of executable, signer of executable, etc.), and/or information regarding the server (e.g., identity of server, identity of server application, etc.). At step 404, the security system may determine if the information regarding the connection can be matched to a corresponding entry of the reputation cache. If the security system determines that the information regarding the connection can be matched to a corresponding entry of the reputation cache, method 400 may proceed to step 406. Otherwise, method 400 may proceed to step 408.

At step 406, responsive to determining that information regarding the connection can be matched to a corresponding entry of the reputation cache, the security system may take a remedial action in accordance with a security policy (e.g., increase inspection, prevent traffic, etc.). In some embodiments, the security system may communicate a policy decision and/or remedial action to the client. After completion of step 406, method 400 may end.

At step 408, responsive to determining that information regarding the connection cannot be matched to a corresponding entry of the reputation cache, the security system may allow traffic to continue in its normal fashion without a remedial action.

Although FIG. 4 discloses a particular number of steps to be taken with respect to method 400, method 400 may be executed with greater or fewer steps than those depicted in FIG. 4. In addition, although FIG. 4 discloses a certain order of steps to be taken with respect to method 400, the steps comprising method 400 may be completed in any suitable order.

Method 400 may be implemented using CPU 102, security system 118 executing thereon, and/or any other system operable to implement method 400. In certain embodiments, method 400 may be implemented partially or fully in software and/or firmware embodied in computer-readable media.

In addition to the functionality above, the security system may, if traffic is allowed due to no match being found in the reputation cache, inspect the traffic and if malicious activity is seen during the connection, dynamically update the reputation information for the client and/or program, determine a security policy to be applied to the updated reputation information, and take remedial action if required in accordance with the policy (e.g., prevent the client or program from connecting and/or accepting connections and/or display a notification to the user).

Although the foregoing contemplates that security system 118 resides in security device 220, in some embodiments, security system 118 may be implemented by a device external to security device 220, including without limitation a device within external network 202. In yet other embodiments, the functionality described above, particularly that of method 300, may be implemented within a client device and/or a cloud-based inspection system.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding this disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. A computer-implemented method for managing network communication, comprising:
    building a reputation cache by correlating malicious network activities to execution of particular executable programs on particular clients; and
    responsive to an attempted connection from a client to a server:
        receiving information regarding the connection from the client, wherein the information regarding the connection comprises information regarding a user associated with an executable program used by the client to establish the connection;
        determining if the information regarding the connection matches an entry of the reputation cache;
        responsive to determining that the information regarding the connection matches an entry of the reputation cache, undertaking a remedial action in accordance with a security policy; and
        responsive to detecting a malicious action associated with traffic of the connection, updating the reputation cache such that a signer of the executable program is categorized as suspicious, and such that a risk level of the user associated with the executable program is adapted.

2. The method of claim 1, wherein the remedial action comprises at least one of increasing inspection of the traffic of the connection and prevention of communication of the traffic.

3. The method of claim 1, wherein the information regarding the connection comprises information regarding the client and information regarding the executable program used by the client to establish the connection.

4. The method of claim 1, wherein the information regarding the connection comprises information regarding the server.

5. The method of claim 1, wherein the information regarding the connection comprises information regarding the signer of the executable program used by the client to establish the connection.

6. The method of claim 1, further comprising responsive to determining that the information regarding the connection does not match an entry of the reputation cache:
    allowing the traffic;
    inspecting the traffic;
    updating the reputation cache in response to detecting a malicious action associated with the traffic; and
    undertaking a remedial action in response to detecting the malicious action.

7. A system comprising:
    a processor; and
    a non-transitory, computer-readable storage medium embodying computer program code comprising instructions executable by the processor and configured for:
        building a reputation cache by correlating malicious network activities to execution of particular executable programs on particular clients; and
        responsive to an attempted connection from a client to a server:
            receiving information regarding the connection from the client, wherein the information regarding the connection comprises information regarding a user associated with an executable program used by the client to establish the connection;
            determining if the information regarding the connection matches an entry of the reputation cache;
            responsive to determining that the information regarding the connection matches an entry of the reputation cache, undertaking a remedial action in accordance with a security policy; and
            responsive to detecting a malicious action associated with traffic of the connection, updating the reputation cache such that a signer of the executable program is categorized as suspicious, and such that a risk level of the user associated with the executable program is adapted.

8. The system of claim 7, wherein the remedial action comprises at least one of increasing inspection of the traffic of the connection and prevention of communication of the traffic.

9. The system of claim 7, wherein the information regarding the connection comprises information regarding the client and information regarding the executable program used by the client to establish the connection.

10. The system of claim 7, wherein the information regarding the connection comprises information regarding the server.

11. The system of claim 7, wherein the information regarding the connection comprises information regarding the signer of the executable program used by the client to establish the connection.

12. The system of claim 7, the instructions further configured for, responsive to determining that the information regarding the connection does not match an entry of the reputation cache:

allowing the traffic;

inspecting the traffic;

updating the reputation cache in response to detecting a malicious action associated with the traffic; and undertaking a remedial action in response to detecting the malicious action.

13. A non-transitory, computer-readable storage medium embodying computer program code, the computer program code comprising computer executable instructions configured for:

building a reputation cache by correlating malicious network activities to execution of particular executable programs on particular clients; and responsive to an attempted connection from a client to a server:

receiving information regarding the connection from the client, wherein the information regarding the connection comprises information regarding a user associated with an executable program used by the client to establish the connection;

determining if the information regarding the connection matches an entry of the reputation cache;

responsive to determining that the information regarding the connection matches an entry of the reputation cache, undertaking a remedial action in accordance with a security policy; and responsive to detecting a malicious action associated with traffic of the connection, updating the reputation cache such that a signer of the executable program is categorized as suspicious, and such that a risk level of the user associated with the executable program is adapted.

14. The storage medium of claim 13, wherein the remedial action comprises at least one of increasing inspection of the traffic of the connection and prevention of communication of the traffic.

15. The storage medium of claim 13, wherein the information regarding the connection comprises information regarding the client and information regarding the executable program used by the client to establish the connection.

16. The storage medium of claim 13, wherein the information regarding the connection comprises information regarding the server.

17. The storage medium of claim 13, wherein the information regarding the connection comprises information regarding the signer of the executable program used by the client to establish the connection.

18. The storage medium of claim 13, the computer executable instructions further configured for, responsive to determining that the information regarding the connection does not match an entry of the reputation cache:

allowing the traffic;

inspecting the traffic;

updating the reputation cache in response to detecting a malicious action associated with the traffic; and undertaking a remedial action in response to detecting the malicious action.

\* \* \* \* \*